United States Patent
Ho

[19]

[11] Patent Number: 5,897,200
[45] Date of Patent: Apr. 27, 1999

[54] STRUCTURAL MODIFICATION FOR LASER INDICATOR

[76] Inventor: Ko-Liang Ho, No. 305, Hua Cheng Rd., Hsinchuang, Taipei Hsien, Taiwan

[21] Appl. No.: 08/872,047

[22] Filed: Jun. 10, 1997

[51] Int. Cl.$^6$ ....................................................... F21K 7/00
[52] U.S. Cl. ........................... 362/259; 362/116; 362/119
[58] Field of Search .................................... 362/118, 109, 362/119, 120, 253, 259, 116

[56] References Cited

U.S. PATENT DOCUMENTS 5,617,304   4/1997   Huang ...................................... 362/118
5,697,700  12/1997   Huang ...................................... 362/259

*Primary Examiner*—Stephen Husar
*Attorney, Agent, or Firm*—Rosenberg, Klein & Bilker

[57] ABSTRACT

The laser indicator consists of an outer casing, a laser device, a front connecting plate, a front cover, a rear connecting plate, a spring coil and a rear cover. The laser device is positioned inside the outer casing. The front connecting plate is connected to the front part of the outer casing, while the front cover is positioned before the front connecting plate. The spring coil is connected behind the circuit board of the laser device, and the back of spring coil can be connected to one of the battery terminals. The rear connecting plate is connected to the back of the outer casing. The rear connecting plate is equipped with a hollow cutting tube, and the back end of the cutting tube is in the form of a blade. The front side of rear connecting plate is connected to the other circuit of the battery. The rear cover is fitted over the rear connecting plate with screws to encase the cutting tube behind the rear cover.

3 Claims, 3 Drawing Sheets

STRUCTURAL MODIFICATION FOR LASER INDICATOR

THE DESCRIPTION OF THE INVENTION

This invention pertains to the structural modification for laser indicator, especially for one that doubles as an indicator and a cigar cutter.

The commonly known laser indicator merely allows the projection of laser beam for the sole function indicating, and does not have any other features. The application is limited and cannot be used for a widespread purposes.

The main objective of this invention is to provide structural modification to the laser indicator. The laser indicator is made of an outer casing, the laser device, the front connecting plate, the front cover, the rear connecting plate, spring coil and the rear cover. It is basically made of a cutting tube connected to the rear connecting plate so that the cutting tube can be used for cutting the cigar tips. Therefore, it doubles as an indicator light and a cigar cutter. The actual description of this invention is as follows:

DESCRIPTION WITH FIGURES

Figure 1:
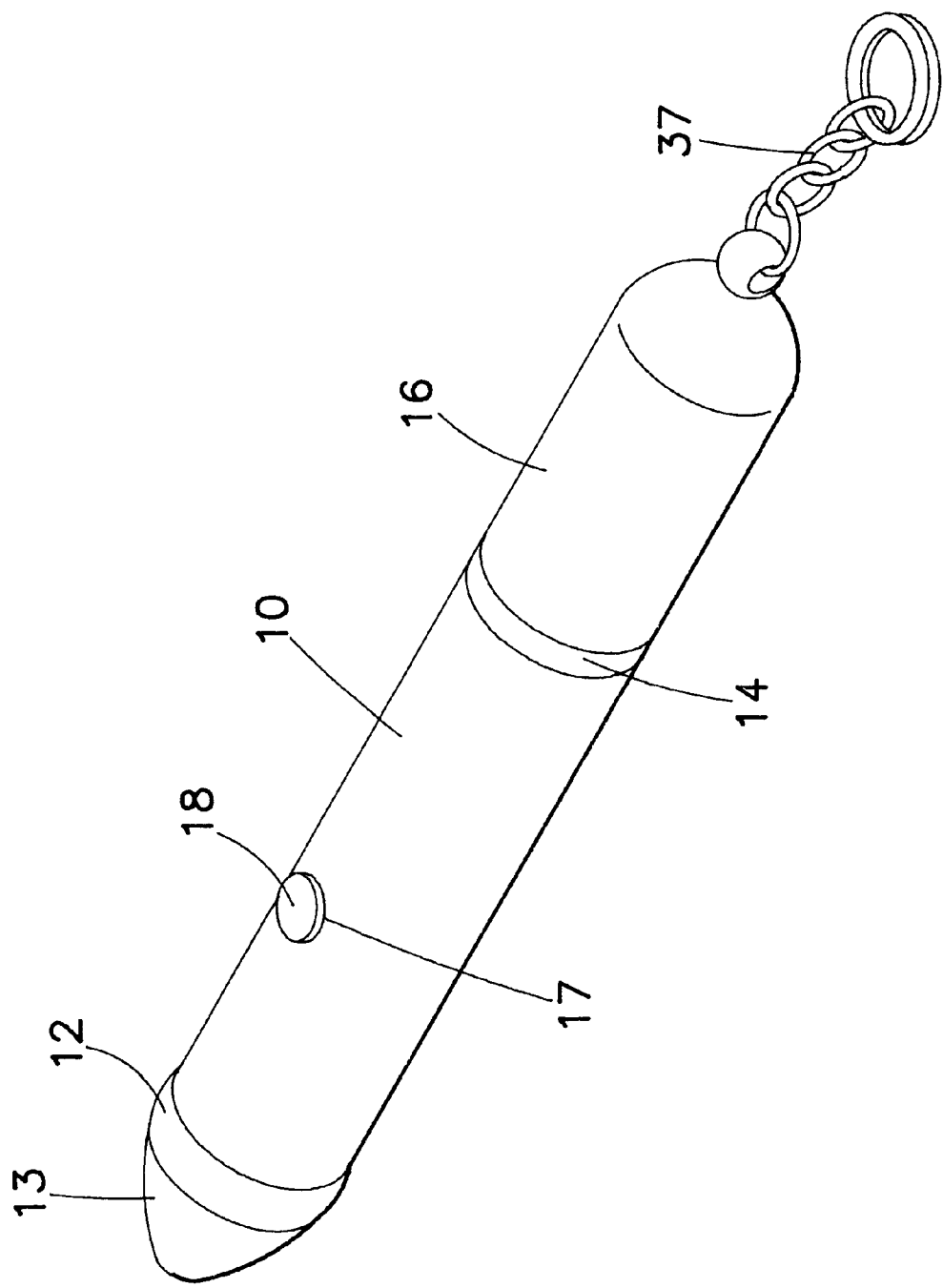

FIG. 1 Three-dimensional assembly of this invention.

Figure 2:
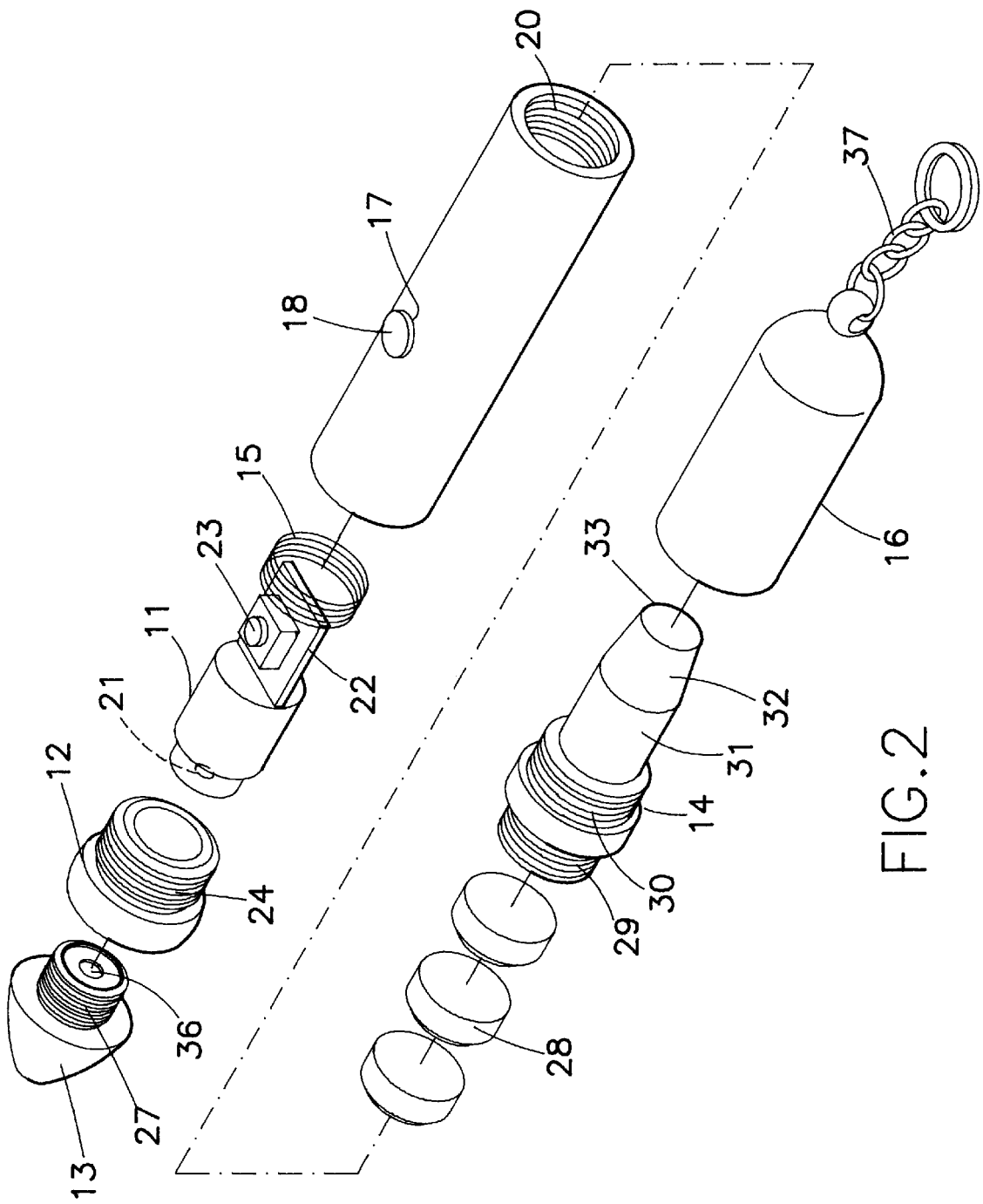

FIG. 2 Three-dimensional section of this invention.

Figure 3:
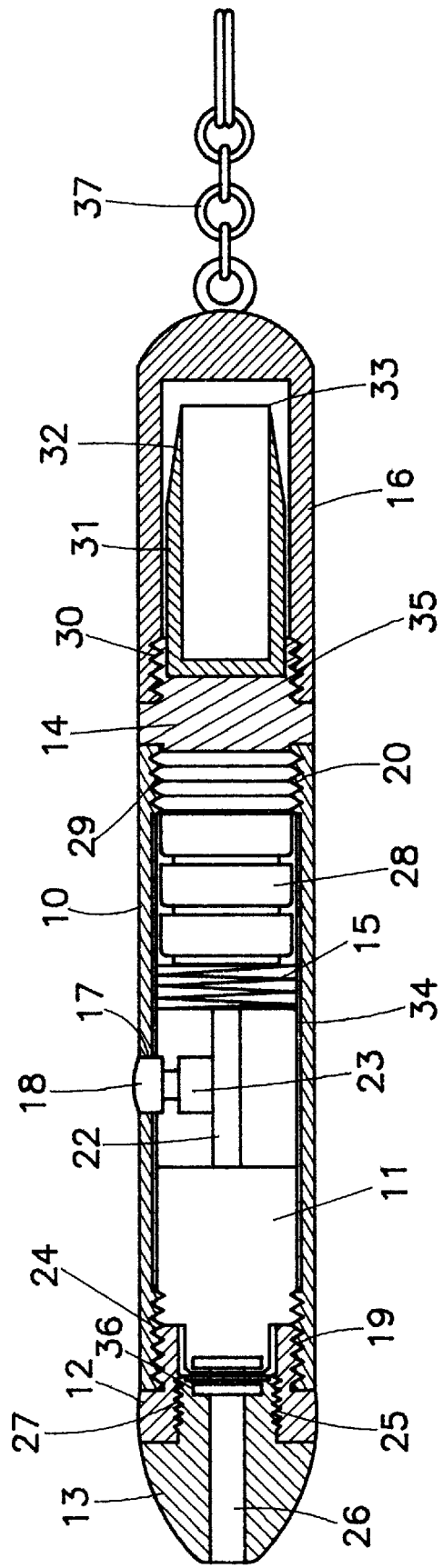

FIG. 3 Cross-section of this invention.

EXPLANATION OF SYMBOLS

| | |
|---|---|
| 10 Outer casing | 11 The laser device |
| 12 The front connecting plate | 13 The front cover |
| 14 The rear connecting plate | 15 The spring coil |
| 16 The rear cover | 17 A hole opening |
| 18 The touch button switch | 19 An inner threading |
| 20 An inner threading | 21 The light beam outlet |
| 22 The circuit board | 23 A switch |
| 24 An outer threading | 25 An inner threading |
| 26 A light beam outlet | 27 An outer threading |
| 28 The battery | 29 An outer threading |
| 30 An outer threading | 31 The cutting tube |
| 32 A slanted surface | 33 The blade |
| 34 The insulation | 35 An inner threading |
| 36 A full image film | 37 A key chain |

Please refer to FIG. 1, FIG. 2 and FIG. 3 for this invention's three-dimensional assembly drawing, three-dimensional section drawing and the cross-section drawing. This creation is to provide structural modification to the laser indicator, which consists of an outer casing 10, a laser device 11, a front connecting plate 12, a front cover 13, a rear connecting plate 14, a spring coil 15, and a rear cover 16. The outer casing 10 is a round hollow tubular object with an appropriate length and furnished with an opening 17. Inside the opening 17, it is equipped with an on/off touch button switch 18, and the top of the button switch 18 is raised above the opening 17. There is inside threading 19, 20, at the front and the rear ends of the outer casing 10. The interior wall of the outer casing can be attached with insulation 34.

Inside the laser device 11, it is equipped with a common laser diode, not shown in the Figures, and in front of the laser device 11, there is a light beam output 21 for the projection of laser beam. A circuit board 22 is connected behind the laser device 11 and with a touch switch 23 soldered onto the circuit board 22. The laser device 11 is secured at an appropriate position inside the outer casing 11 by screw or mounting methods, and the touch switch 23 should be positioned to the touch button 18 at the opening 17 of the outer casing 10.

The front connecting plate 12 is a hollow tubular piece, with the outer and inner walls finished with outer threading 24 and inner threading 25. The outer threading 24 of front connecting plate 12 is used to connect with the inner threading 19 at the front of the outer casing 10 in order to position the front connecting plate 12 on the front side of the outer casing 10.

The front cover 13 has a light beam outlet 26, and the exterior of the front cover 13 is furnished with outer threading 27. The outer threading 27 on the front cover 13 is used to connect to the inner threading 25 on the front connecting plate 12 so the front cover 13 is connected before the front part of the front connecting plate 12.

The spring coil 15 is a conductor which connect to the rear of the circuit board 22. The end of the spring coil 15 is in contact with one end of the batteries 28 in order to facilitate the transmission of power from the batteries 28 to the circuit board 22 and the laser device 11.

The exterior of the rear connecting plate 14 has two sections of outer threading 29, 30, and its back is equipped with a hollow round cutting tube 31. The exterior on the back side of the cutting tube 31 is processed to a slanted surface 32 in order to form a blade 33 behind the cutting tube 31. The first section of the outer threading 29 on the rear connecting plate 14 is used to connect with the inner threading 20 at the back of the outer casing 10 in order for the rear connecting plate 14 to be positioned at the back of the outer casing 10. The front of the rear connecting plate 14 is connected to one of the battery 28 terminals in order to transmit the battery 28 power through the outer casing 10 to the laser device 11 and the circuit board 22.

The rear cover 16 is a hollow cap with an opening in the front, and the rim of its interior is threaded with inside threading 35. The inner threading 35 on the rear cover 16 is used to connect to the threading 14 at the rear connecting plate so that the rear cover 15 can swivel around the rear connecting plate 14 and encase the cutting tube 31 behind the rear cover 16 to prevent injury when the unit is not in use.

When using this invention's laser indicator, the touch button is maneuvered to operate the on and off positions to appropriately control the laser beam projecting from the light beam outlet 21 at the laser device 11 through the light beam opening 26 at the front cover 13 to function as an indicator light. The main feature of this invention is that the cutting tube 31 is attached at the rear connecting plate 14 to allow the exposure of the cutting tube 31 when the rear cover 16 is turned to provide a cigar cutting function. The invention provides the double feature of an indicator and a cigar cutter for a wider application.

Furthermore, this invention can also accommodate a full image film 36 behind the front cover 13 so that the laser beam projection has a pattern variation. In addition, a key ring 37 can also be attached to the rear cover 16.

Summarizing the above, this invention is essentially a unique new invention to improve the problem with commonly known laser indicator that only has a singular indicator function. It is indeed a creative and progressive product. It meets the criteria for applying new patent application, hence the application is filed according to the patent laws. Kindly review and approve this patent to protect the inventor's right.

Nonetheless, the aforementioned are merely some of the more prominent implementations and does not confine the scope of patent for this invention. Therefore, all equivalent structural variations pertaining to the operating manual and Figures of this invention are entirely inclusive in the content of this invention.

I claim:

1. An improved laser indicator, comprising:

a tubular member forming an outer casing of the laser indicator, said tubular member having a front end, a rear end, and an insulated inner surface therebetween, said insulated inner surface circumscribing a chamber within said tubular member, a sidewall portion of said tubular member being formed with an opening therethrough;

a press button extending through said sidewall opening;

a laser device secured within said chamber, said laser device having a first light beam outlet formed in a front face thereof;

a circuit board contacting a rear face of said laser device, a touch actuated switch for selectively actuating said laser device, said switch being coupled to said circuit board and being positionally aligned with said press button for actuation thereby;

a front connecting plate removably coupled to said front end of said tubular member, a tubular portion of said front connecting plate defining a light passage therethrough;

a front cover removably coupled to a front portion of said front connecting plate, a tubular portion of said front cover having a second light beam outlet formed therethrough and being in optical communication with said first light beam outlet of said laser device and said light passage in said front connecting plate;

an electrical power source retained within said chamber for providing electrical power to operate said laser device, said power source having front and rear electrical terminals;

an electrically conductive coil spring extending between and contacting a rear face of said circuit board and said front terminal of said electrical power source;

a rear connecting plate having a front end thereof removably coupled to said rear end of said tubular member, a front face of said rear connecting plate contacting said rear electrical terminal of said electrical power source, a rear end of said connecting plate having a circumferentially formed, hollow cutting tube extending therefrom, a slanted surface of said cutting tube forming a blade portion at a rear end of said cutting tube; and a cover having a recess formed therein for receiving said cutting tube, said cover having an open end removably coupled to said rear end of said rear connecting plate.

2. The improved laser indicator as recited in claim 1 further comprising a full image film is provided in a recess formed in a rear surface of said front cover.

3. The improved laser indicator as recited in claim 1 further comprising a key ring is coupled to a rear surface of said cover for said cutting tube.

\* \* \* \* \*